United States Patent
Ahn et al.

(10) Patent No.: US 9,946,416 B2
(45) Date of Patent: Apr. 17, 2018

(54) TOUCH SENSOR DEVICE AND DISPLAY DEVICE INCLUDING THE SAME

(71) Applicant: Samsung Display Co., Ltd., Yongin, Gyeonggi-Do (KR)

(72) Inventors: Soon Sung Ahn, Cheonan-si (KR); Hyoung Wook Jang, Anyang-si (KR); Seung Heui Jeong, Cheonan-si (KR); Joo Hyung Lee, Gwacheon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 314 days.

(21) Appl. No.: 14/742,443

(22) Filed: Jun. 17, 2015

(65) Prior Publication Data
US 2016/0195946 A1    Jul. 7, 2016

(30) Foreign Application Priority Data
Jan. 7, 2015    (KR) .......................... 10-2015-0002079

(51) Int. Cl.
*G06F 3/044*    (2006.01)
*G06F 3/041*    (2006.01)

(52) U.S. Cl.
CPC ............ *G06F 3/044* (2013.01); *G06F 3/0416* (2013.01); *G06F 2203/04111* (2013.01); *G06F 2203/04113* (2013.01)

(58) Field of Classification Search
None
See application file for complete search history.

(56) References Cited

U.S. PATENT DOCUMENTS

| | | | |
|---|---|---|---|
| 2007/0074914 A1* | 4/2007 | Geaghan ................. | G06F 3/044 178/18.06 |
| 2009/0167713 A1* | 7/2009 | Edwards ................. | G06F 3/044 345/173 |
| 2013/0265279 A1* | 10/2013 | Park ........................ | G06F 3/044 345/174 |
| 2014/0015739 A1* | 1/2014 | Tsao ....................... | G09G 3/3648 345/87 |
| 2014/0054070 A1 | 2/2014 | Ichiki | |
| 2014/0333855 A1* | 11/2014 | Park ........................ | G06F 3/041 349/12 |
| 2015/0227233 A1* | 8/2015 | Yi ........................... | G06F 3/0416 345/174 |

(Continued)

FOREIGN PATENT DOCUMENTS

| KR | 10-2012-0035490 | 4/2012 |
|---|---|---|
| KR | 10-2013-0122907 | 11/2013 |

*Primary Examiner* — Seokyun Moon
(74) *Attorney, Agent, or Firm* — Innovation Counsel LLP

(57) ABSTRACT

Disclosed is a touch sensor device, including: a plurality of first sensing electrodes which includes a plurality of first linear electrodes extending in a first direction and a first connection electrode connecting the plurality of first linear electrodes to each other; and a plurality of second sensing electrodes which includes a plurality of second linear electrodes extending in a second direction perpendicular to the first direction and a second connection electrode connecting the plurality of second linear electrodes to each other, in which a disposition density of the plurality of first linear electrodes included in one first sensing electrode is gradually decreased from a center of the first sensing electrode to an outer side of the first sensing electrode.

18 Claims, 11 Drawing Sheets

(56) References Cited

U.S. PATENT DOCUMENTS

2016/0147375 A1* 5/2016 Bok .................. G06F 3/0421
                                                    345/175
2016/0154522 A1* 6/2016 Shahparnia ............ G06F 3/044
                                                    345/173

* cited by examiner

TOUCH SENSOR DEVICE AND DISPLAY DEVICE INCLUDING THE SAME

CROSS-REFERENCE TO RELATED APPLICATION

This application claims priority to and the benefit of Korean Patent Application No. 10-2015-0002079 filed in the Korean Intellectual Property Office on Jan. 7, 2015, the entire contents of which are incorporated herein by reference.

BACKGROUND (a) Field

The Embodiment of the present inventive concept relates to a touch sensor device and a display device including the same, and more particularly, to a capacitive touch sensor device and a display device including the same.

(b) Description of the Related Art

In general, a display panel of a liquid crystal display (LCD), an organic light emitting diode display, and the like includes a plurality of gate lines and a plurality of data lines connected to a plurality of pixels. The plurality of pixels are formed at crossing points of the gate lines and the data lines. When a gate signal of a gate on voltage is sequentially applied to the plurality of gate lines, a data voltage is applied to the plurality of data lines in response to the gate signal of the gate on voltage, so that image data are written in the plurality of pixels.

A touch sensor device is an input device for recognizing a touch position of a user and inputting a command of the user. The touch sensor device is provided on a front surface of the display panel, and recognizes a position of a touch by a hand or an object and determines an input signal. A capacitance method that is one of the implementation methods of the touch sensor device is mainly used. The capacitance method is a method of detecting a change in capacitance formed between an electrode and a conductive object, such as a finger, according to the existence of a touch.

Recently, a display device on which a user is capable of drawing a picture or writing letters by using an input device, such as a pen, has been released. In order to draw a fine picture or a small letter by using the input device, the touch sensor device needs to precisely recognize a touch position. However, the current touch sensor device has a limit in recognizing a touch position precisely enough to accurately recognize a fine picture or a small letter.

The above information disclosed in this Background section is only for enhancement of understanding of the background of the inventive concept and therefore it may contain information that does not form the prior art.

SUMMARY

The present inventive concept has been made in an effort to provide a touch sensor device capable of precisely recognizing a touch position, and a display device including the same.

An exemplary embodiment of the present inventive concept provides a touch sensor device, including: a plurality of first sensing electrodes which includes a plurality of first linear electrodes extending in a first direction and a first connection electrode which connects the plurality of first linear electrodes to each other; and a plurality of second sensing electrodes which include a plurality of second linear electrodes extending in a second direction perpendicular to the first direction and a second connection electrode connecting the plurality of second linear electrodes to each other, in which a disposition density of the plurality of first linear electrodes included in one first sensing electrode is gradually decreased from a center of the first sensing electrode to an outer side of the first sensing electrode.

The plurality of first linear electrodes included in the first sensing electrode may form a plurality of electrode groups, and the number of first linear electrodes included in each of the electrode groups may be gradually decreased from a center electrode group to an outer electrode group.

A group interval between the plurality of electrode groups may be larger than a line interval between the adjacent first linear electrodes.

The group interval may be increased from the center electrode group to the outer electrode group.

The first linear electrodes included in another adjacent first sensing electrode may be disposed between the electrode groups included in the first sensing electrode.

The n−1 first linear electrodes included in the another adjacent first sensing electrode may be disposed between the electrode groups having the group interval that is n times the line interval.

A disposition density of the plurality of second linear electrodes included in one second sensing electrode may be gradually decreased from a center of the second sensing electrode to an outer side of the second sensing electrode.

The plurality of second linear electrodes included in the second sensing electrode may form a plurality of electrode groups, and the number of second linear electrodes included in each of the electrode groups may be gradually decreased from a center electrode group to an outer electrode group.

The second linear electrodes included in another adjacent second sensing electrode may be disposed between the electrode groups included in the second sensing electrode.

At least one of the plurality of first linear electrodes and the plurality of second linear electrodes may be formed of a transparent conductive material, such as indium tin oxide (ITO) and indium zinc oxide (IZO).

At least one of the plurality of first linear electrodes and the plurality of second linear electrodes may be formed by a metal mesh having a rectangular lattice pattern.

At least one of the plurality of first linear electrodes and the plurality of second linear electrodes may be formed by a metal mesh having a rhombus lattice pattern.

A line width of the plurality of second linear electrodes included in one second sensing electrode may be gradually decreased from a center of the second sensing electrode to an outer side of the second sensing electrode.

The first connection electrode may extend from one end of each of the plurality of first linear electrodes in the second direction to connect the plurality of first linear electrodes to each other.

The first sensing electrode may further include a first cross connection electrode which extends in the second direction within an active area, in which the plurality of first linear electrodes and the plurality of second linear electrodes cross, and connects the plurality of first linear electrodes to each other.

The first sensing electrode may further include a first sub connection electrode which extends from the other end of each of the plurality of first linear electrodes in the second direction and connects the plurality of first linear electrodes to each other.

The second sensing electrode may further include a second cross connection electrode which extends in the first direction within the active area and connects the plurality of second linear electrodes to each other.

The second sensing electrode may further include a second sub connection electrode which extends from the other end of each of the plurality of second linear electrodes in the first direction and connects the plurality of second linear electrodes to each other.

Another exemplary embodiment of the present inventive concept provides a display device, including: a display panel which displays an image; a first sensing electrode which is disposed on the display panel and includes a plurality of first linear electrodes extending in a first direction and a first connection electrode connecting the plurality of first linear electrodes to each other; and a second sensing electrode which is disposed on the first sensing electrode and includes a plurality of second linear electrodes extended in a second direction perpendicular to the first direction and a second connection electrode for connecting the plurality of second linear electrodes to each other, in which a disposition density of at least one of the plurality of first linear electrodes and the plurality of second linear electrodes is gradually decreased from a center to an outer side of the linear electrodes.

A line width of the other electrodes among the plurality of first linear electrodes and the plurality of second linear electrodes may be gradually decreased from a center to an outer side of the linear electrodes.

According to the exemplary embodiments of the present inventive concept, it is possible to detect a linear touch position of a small touch pen and improve accuracy of recognizing a touch position.

DETAILED DESCRIPTION OF THE EMBODIMENTS

Figure 1:
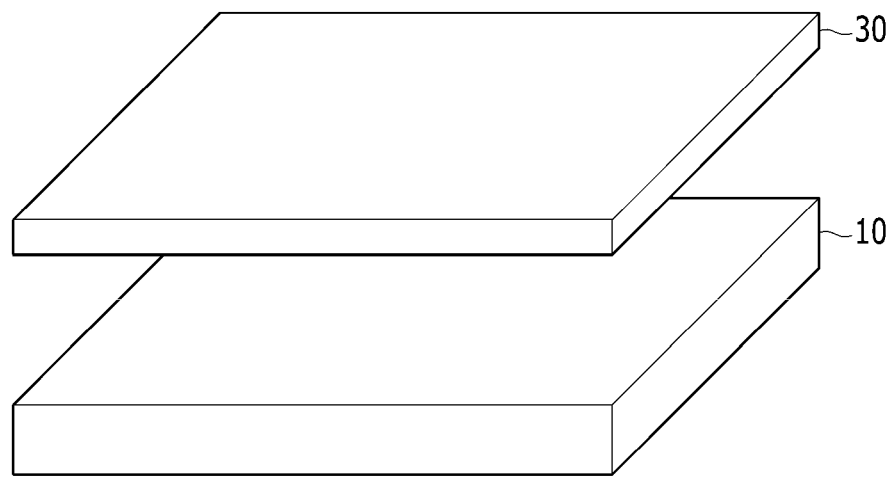
FIG. 1 is a schematic perspective view of a display device according to an exemplary embodiment of the present inventive concept.

Hereinafter, exemplary embodiments of the present inventive concept will be described in detail with reference to the accompanying drawings so that those skilled in the art may easily practice the present inventive concept. As those skilled in the art would realize, the described embodiments may be modified in various different ways, all without departing from the spirit or scope of the present inventive concept.

In addition, in various exemplary embodiments, the same reference numerals are used in respects to the constituent elements having the same constitution and illustrated in the first exemplary embodiment, and in the other exemplary embodiment, only constitution that is different from that of the first exemplary embodiment is illustrated.

In describing the present inventive concept, parts that are not related to the description will be omitted. Like reference numerals generally designate like elements throughout the specification.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present between the element and the another element. In contrast, when an element is referred to as being "directly on" another element, there are no intervening elements present. Further, when an element is referred to as being "connected to" another element, the element may be "directly coupled" to the other element or "electrically coupled" to the other element through a third element interposed therebetween. In addition, unless explicitly described to the contrary, the word "comprise" and variations such as "comprises" or "comprising", will be understood to imply the inclusion of stated elements but not the exclusion of any other elements.

FIG. 1 is a schematic perspective view of a display device according to an exemplary embodiment of the present inventive concept.

Referring to FIG. 1, a display device includes a display panel 10 and a touch sensor device 30 disposed on the display panel 10. The touch sensor device 30 may be formed on an outer surface of the display panel 10 in an on-cell type. Otherwise, the touch sensor device 30 may be formed on a separate substrate formed of a transparent insulator, such as glass and plastic, and attached onto the display panel 10. Here, in contrast to the illustration, the touch sensor device 30 may also be formed inside the display panel 10 in an in-cell type.

The display panel 10 includes a plurality of display elements. The plurality of display elements may be any one of a display element of an organic light emitting diode (OLED) display, a liquid crystal display (LCD), and a field emission display (FED). That is, the display panel 10 may be a display panel of any one of an OLED, an LCD, and an FED.

The touch sensor device 30 may be implemented by various methods, such as a resistive method, a capacitive method, an ultrasonic method, an optical sensor method, and an electromagnetic induction method. In the present inventive concept, the touch sensor device 30 is a capacitive type touch sensor device.

Hereinafter, the present inventive concept will be described based on an example in which the display panel 10 is an LCD.

Figure 2:
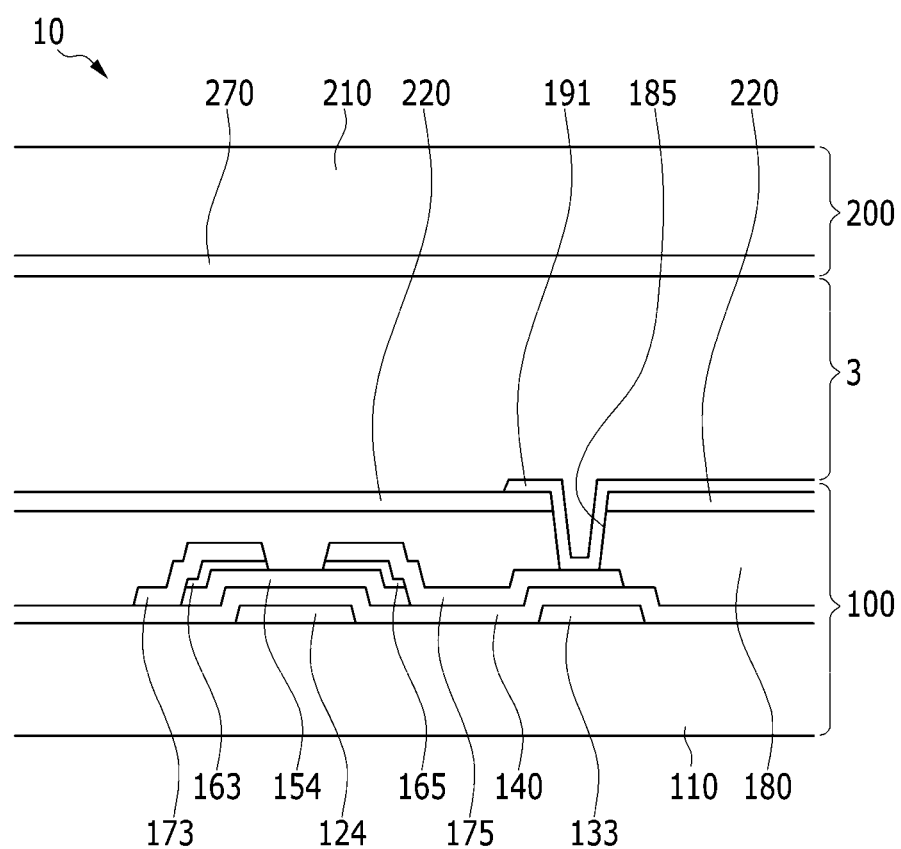
FIG. 2 is a cross-sectional view illustrating a display panel according to an exemplary embodiment of the present inventive concept.

FIG. 2 is a cross-sectional view illustrating the display panel according to an exemplary embodiment of the present inventive concept.

Referring to FIG. 2, the display panel 10 includes a lower panel 100 and an upper panel 200 which face each other, and a liquid crystal layer 3 interposed between the two panels 100 and 200.

First, the lower panel 100 will be described.

The lower panel 100 includes gate lines and storage lines on a first substrate 110 formed of transparent glass or plastic. The gate line transmits a gate signal and mainly extends in a horizontal direction, and includes a gate electrode 124 protruding from the gate line.

The storage line receives a predetermined voltage, and mostly extends in the horizontal direction. Each storage line includes a storage electrode 133 extending from the storage line.

A gate insulating layer 140 is disposed on the gate electrode 124 and the storage electrode 133. The gate insulating layer 140 may be formed of silicon oxide (SiOx) or silicon nitride (SiNx). The gate insulating layer 140 may have a multilayered structure including at least two insulating layers having different physical properties.

A semiconductor 154 is formed on the gate insulating layer 140. The semiconductor 154 may be formed of hydrogenated amorphous silicon, crystalline silicon, and the like. The semiconductor 154 may include a semiconductor oxide.

Ohmic contact members 163 and 165 which face each other are paired up and positioned on the semiconductor 154. The ohmic contact members 163 and 165 may made of a material, such as n+ hydrogenated amorphous silicon doped with an n-type impurity, such as phosphorus, at a high concentration, or may be made of silicide. The ohmic contact members 163 and 165 may be paired up and disposed on the semiconductor 154. When the semiconductor 154 is the semiconductor oxide, the ohmic contact members 163 and 165 may be omitted.

A data line including a source electrode 173 and a drain electrode 175 are disposed on the ohmic contact members 163 and 165 and the gate insulating layer 140.

The data line transmits a data voltage and mainly extends in a vertical direction and crosses the gate line.

The drain electrode 175 faces the source electrode 173 with the gate electrode 124 interposed therebetween in a plan view.

One gate electrode 124, one source electrode 173, and one drain electrode 175 form one thin film transistor (TFT) together with the semiconductor 154, and a channel of the thin film transistor is formed in the semiconductor 154 between the source electrode 173 and the drain electrode 175.

The data line and the drain electrode 175 may be made of refractory metal, such as molybdenum, chromium, tantalum, and titanium, or an alloy thereof, and may have a multilayered structure including a refractory metal layer (not illustrated) and a low resistance conductive layer (not illustrated). Examples of the multilayered structure may include a double layer of a chromium or molybdenum (alloy) lower layer and an aluminum (alloy) upper layer, and a triple layer of a molybdenum (alloy) lower layer, an aluminum (alloy) intermediate layer, and a molybdenum (alloy) upper layer. However, the data line 171 and the drain electrode 175 may be made of various metals or conductors in addition to those illustrated above.

A passivation layer 180 is formed on the drain electrode 175, the source electrode 173, and the exposed semiconductor 154. The passivation layer 180 may be formed of an inorganic insulating material, such as silicon nitride and silicon oxide, an organic insulating material, or an insulating material having a low dielectric constant which is 4.0 or lower.

An overcoat 220 is disposed on the passivation layer 180. The overcoat 220 may be formed of an inorganic insulating material, and provides a flat surface. The overcoat 220 may be omitted.

The passivation layer 180 and the overcoat 220 includes a contact hole 185 through which the drain electrode 175 is exposed.

A pixel electrode 191 is formed on the overcoat 220. The pixel electrode 191 is formed of a transparent conductive material, for example, ITO and IZO, and is electrically connected to the drain electrode 175 through the contact hole 185.

An alignment layer (not illustrated) may be formed on the pixel electrode 191 and the overcoat 220.

Next, the upper panel 200 will be described.

The upper panel 200 includes a second substrate 210 and a common electrode 270 disposed on the second substrate 210.

The common electrode 270 may be formed on a substantially entire front surface of the second substrate 210 to have a plate shape. The common electrode 270 may be made of a transparent conductive material, such as ITO and IZO. An alignment layer (not illustrated) may be formed under the common electrode 270.

It has been described above that the common electrode 270 is included in the upper panel 200, but the common electrode 270 may be included in the lower panel 100. Further, the structure of the display panel 10 may be variously changed, and the structure of the display panel 10 is not limited in the present inventive concept.

Hereinafter, a configuration of the touch sensor device 30 according to the exemplary embodiment of the present inventive concept will be described with reference to FIGS. 3 to 5.

Figure 3:
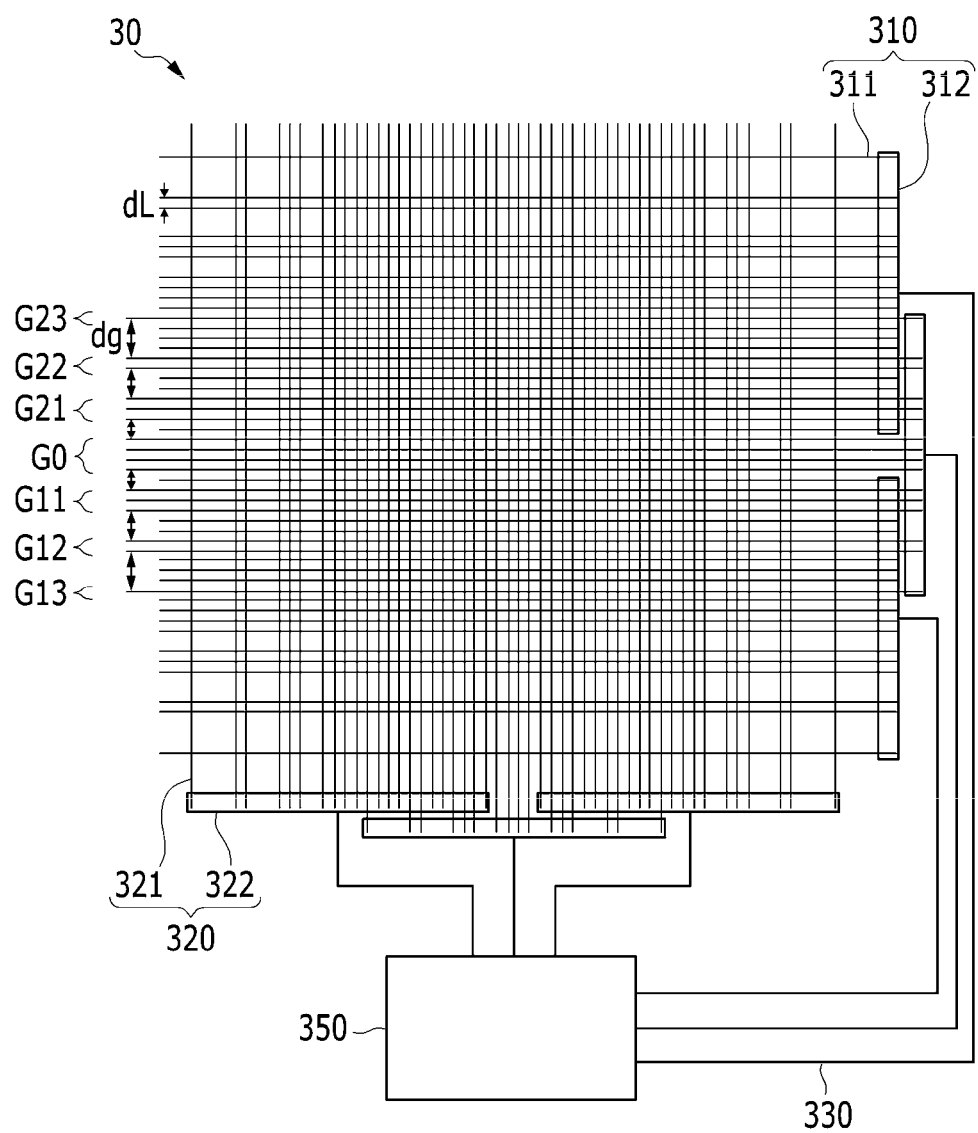
FIG. 3 is a top plan view illustrating a touch sensor device according to an exemplary embodiment of the present inventive concept.

FIG. 3 is a top plan view illustrating the touch sensor device according to the exemplary embodiment of the present inventive concept. FIG. 4 is a diagram illustrating an example of a linear electrode of the touch sensor device of FIG. 3. FIG. 5 is a diagram illustrating another example of a linear electrode of the touch sensor device of FIG. 3.

Figure 5:
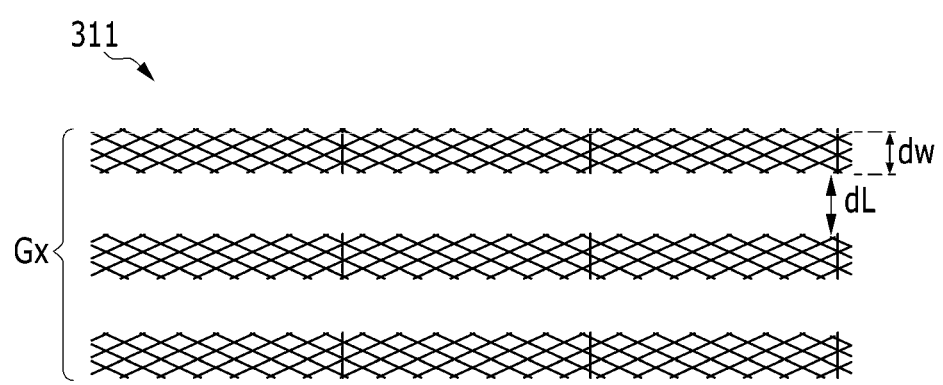
FIG. 5 is a diagram illustrating another example of a linear electrode of the touch sensor device of FIG. 3.

Referring to FIGS. 3 and 5, the touch sensor device 30 includes a plurality of first sensing electrodes 310, a plurality of second sensing electrodes 320, a plurality of signal lines 330, and a touch controller 350. The number of first sensing electrodes 310, the number of second sensing electrodes 320, and the number of signal lines 330 are not limited.

Each of the plurality of first sensing electrodes 310 includes a plurality of first linear electrodes 311 extending in a first direction (horizontal direction), and a first connection electrode 312 connecting the plurality of first linear electrodes 311 with each other. The plurality of first linear electrodes 311 may be spaced apart from each other at a predetermined interval to be disposed in parallel to each other. The number of first linear electrodes 311 included in one first sensing electrode 310 is not limited. The first connection electrode 312 may extend from one end of each of the plurality of first linear electrodes 311 in a second direction (vertical direction) perpendicular to the first direction to physically connect the plurality of first linear electrodes 311. The first connection electrode 312 may be disposed in a non-active area outside an active area in which the plurality of first linear electrodes 311 and a plurality of second linear electrodes 321 cross.

The plurality of first linear electrodes 311 included in one first sensing electrode 310 forms a plurality of electrode groups, for example, G0, G11, G12, G13, G21, G22 and G23. Each of the plurality of electrode groups G0 to G23 includes at least one first linear electrode 311. The number of first linear electrodes 311 included in each of the electrode groups G0 to G23 is gradually decreased as the distance from a center electrode group G0 to the plurality of electrode groups is increased. As illustrated in the drawings, the largest number (four) of first linear electrodes 311 are included in the center electrode group G0 located at a center among the plurality of electrode groups G0 to G23. The second largest number (three) of first linear electrodes 311 are included in each of the first electrode groups G11 and G22 at both sides adjacent to the center electrode group G0. The third largest number (two) of first linear electrodes 311 are included in each of the second electrode groups G21 and G22 adjacent to the outer sides of the first electrode groups G11 and G21. The smallest number (one) of first linear electrodes 311 is included in each of the last (third) electrode groups G13 and G23 adjacent to the outer sides of the second electrode groups G12 and G22. Here, it is illustrated that the plurality of first linear electrodes 311 forms seven electrode groups G0 to G23, but the number of electrode groups is not limited.

Group intervals dg between the plurality of electrode groups G0 to G23 included in one first sensing electrode 310 are larger than a line interval dL between the adjacent first linear electrodes 311. The group intervals dg between the electrode groups G0 to G23 are increased as a distance from the center electrode group G0 to the plurality of electrode groups is increased.

As illustrated in FIG. 3, four first linear electrodes 311 are included in the center electrode group G0, three first linear electrodes 311 are included in each of the first electrode groups G11 and G21, two first linear electrodes 311 are included in each of the second electrode groups G12 and G22, and one first linear electrode 311 is included in each of the third electrode groups G13 and G23. The group interval dg between the center electrode group G0 and the first electrode group G11 and G21 is two times of the line interval dL, the group interval dg between the first electrode group G11 and G21 and the second group G12 and G22 are three times of the line interval dL, and the group interval dg between the second group G12 and G22 and the third electrode group G13 and G23 is four times of the group interval dg.

The first linear electrodes 311 included in another adjacent first sensing electrode 310 are disposed between the electrode groups G0 to G23 included in one first sensing electrode 310. The maximum number of first linear electrodes 311 of another first sensing electrode 310 are disposed between the electrode groups G0 to G23 while maintaining the line interval dL. This means that n−1 first linear electrodes 311 of another first sensing electrode 310 are disposed between the electrode groups having the group interval dg of n times of line interval dL. As illustrated in FIG. 3, one first linear electrode 311 of another adjacent first sensing electrode 310 is disposed between the center electrode group G0 and the first electrode group G11 and G21, two first linear electrodes 311 of another adjacent first sensing electrode 310 are disposed between the first electrode groups G11 and G21 and the second electrode groups G12 and G22, and three first linear electrodes 311 of another adjacent first sensing electrode 310 are disposed between the second electrode groups G12 and G22 and the third electrode groups G13 and G23. The first linear electrodes 311 of another adjacent first sensing electrode 310 disposed between the respective electrode groups G0 to G23 also form the electrode group.

The plurality of first sensing electrodes 310 may be physically and electrically disconnected and disposed on the same plane. By contrast, the electrode group of another first sensing electrode 310 is disposed between the electrode groups G0 to G23 of the first sensing electrode 310, so that a disposition region of each of the plurality of first sensing electrodes 310 partially overlaps the adjacent first sensing electrode. The disposition region means a region between the first linear electrodes 311 disposed at the outermost sides included in one first sensing electrode 310.

The disposition region of one first sensing electrode 310 and the disposition region of another first sensing electrode 310 adjacent in the second direction may overlap by less than ½, and the disposition region of another first sensing electrode 310 and the disposition region of yet another first sensing electrode 310 adjacent in the second direction may overlap by less than ½. By the aforementioned method, the plurality of first sensing electrodes 310 may be disposed in the second direction so that the disposition region of the plurality of first sensing electrode 310 overlaps the disposition region of the just adjacent first sensing electrode 310, and the disposition regions do not overlap between the first sensing electrodes 310 which are not adjacent to each other.

Each of the plurality of second sensing electrodes 320 includes the plurality of second linear electrodes 321 extending in the second direction, and a second connection electrode 322 which connects the plurality of second linear electrodes 321 to each other. The plurality of second linear electrodes 321 crosses the plurality of first linear electrodes 311. The plurality of second sensing electrodes 320 have a same configuration as the plurality of first sensing electrodes 310 except an extension direction which perpendicular to the extension direction of the plurality of first sensing electrodes 310, so that a detailed description thereof will be omitted.

An insulating layer (not illustrated) is disposed between the plurality of first sensing electrodes 310 and the plurality of second sensing electrodes 320, so that the plurality of first sensing electrodes 310 and the plurality of second sensing electrodes 320 are physically and electrically disconnected. An inorganic insulating material, such as SiOx and SiNx, may be used as the insulating layer. Otherwise, an organic insulating material, such as a cellulose derivative, an olefin-based resin, an acrylic resin, a vinyl chloride-based resin, a styrene-based resin, a polyester-based resin, a polyamide-based resin, a polycarbonate-based resin, a polycycloolefin resin, and an epoxy resin, may be used as the insulating layer.

The plurality of signal lines 330 is connected to the plurality of first sensing electrodes 310 and the plurality of second sensing electrodes 320 to connect the plurality of first sensing electrodes 310 and the plurality of second sensing electrodes 320 to the touch controller 350. The plurality of signal lines 330 may be connected to the first connection electrodes 312 of the plurality of first sensing electrodes 310 and the second connection electrodes 322 of the plurality of second sensing electrodes 320, respectively.

The touch controller 350 may apply a detection input signal to any one of the plurality of first sensing electrodes 310 and the plurality of second sensing electrodes 320 through the plurality of signal lines 330, and receive a detection output signal indicating a variance in capacitance of the other one of the plurality of first sensing electrodes 310 and the plurality of second sensing electrodes 320, thereby detecting a touch position. For example, the touch controller 350 may sequentially apply the detection input signal to the plurality of first sensing electrodes 310, and measure a variance in capacitance of the plurality of second sensing electrodes 320, thereby detecting the touch position. Otherwise, the touch controller 350 may sequentially apply the detection input signal to the plurality of second sensing electrodes 320, and measure a variance in capacitance of the plurality of first sensing electrodes 310, thereby detecting a touch position.

In the meantime, the plurality of first sensing electrodes 310 and the plurality of second sensing electrodes 320 may be formed of transparent conductive oxide (TCO), such as ITO and IZO, a conductive nanowire, such as silver nanowire (AgNW), a metal mesh, and the like. The plurality of signal lines 330 may be formed of a metal material, such as copper (Cu), aluminum (Al), molybdenum (Mo), and silver (Ag), having excellent conductivity.

Figure 4:
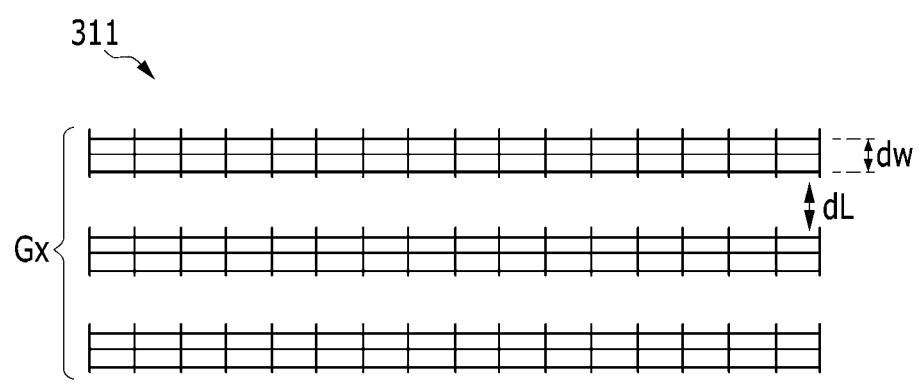
FIG. 4 is a diagram illustrating an example of a linear electrode of the touch sensor device of FIG. 3.

FIGS. 4 and 5 illustrate an example in which the first linear electrode 311 is formed by a metal mesh.

The metal mesh may be fabricated by finely patterning a metal having high conductivity. The metal mesh may be fabricated by a printing method, an imprinting method, a lithography method, and the like. The printing method is a method of directly forming a transparent electrode (or a wire) on a substrate with a transparent conductive material (or a metal material) by using a gravure or offset method. The imprinting method is a method of forming a transparent electrode (or a wire) by forming a fine pattern on a transparent conductive layer or a metal layer and then etching the transparent conductive layer (or the metal layer) by using the fine pattern. The lithography method is a method of forming a transparent electrode (or a wire) by forming a fine pattern on a substrate through a source, such as light, laser, or electron beam, and etching the transparent conductive layer (or the metal layer) by using the fine pattern.

A plurality of metal patterns forming the metal mesh may be formed of a metal material, such as copper (Cu), aluminum (Al), molybdenum (Mo), and silver (Ag) with a linewidth of 0.1 μm to 10 μm. The first linear electrode 311 formed by the metal mesh may have high conductivity and high transparency.

The first linear electrode 311 may be formed by the metal mesh having a rectangular lattice pattern as illustrated in FIG. 4, or the metal mesh having a rhombus lattice pattern as illustrated in FIG. 5. When the first linear electrode 311 is formed by the metal mesh having the lattice pattern, the first linear electrode 311 may be formed to have multiple lattice form to avoid disconnection.

As illustrated in FIGS. 4 and 5, the first linear electrodes 311 included in one electrode group Gx may have the same linewidth dw, and the line intervals dL between the first linear electrodes 311 may be the same as each other. By contrast, as described above, the group interval dg between the electrode groups Gx is gradually increased as the distance from the center electrode group is increased, and the number of first linear electrodes 311 included in the electrode group Gx is gradually decreased. That is, a disposition density of the first linear electrodes 311 in the first sensing electrode 310 is decreased as the distance from the center electrode group is increased, but a disposition density of the first linear electrodes 311 within the electrode group Gx is maintained uniformly.

FIGS. 4 and 5 illustrate only the first linear electrodes 311, but the second linear electrodes 321 may also be equally formed.

In the meantime, the first sensing electrode 310 and the second sensing electrode 320 may be formed of the same material or in the same configuration but may be formed of different materials or in different configuration. For example, the first sensing electrode 310 may be formed of a transparent conductive material, such as ITO and IZO, and the second sensing electrode 320 may also be formed of the metal mesh exemplified in FIGS. 4 and 5. Otherwise, the second sensing electrode 320 may be formed of a transparent conductive material, such as ITO and IZO, and the first sensing electrode 310 may also be formed of the metal mesh exemplified in FIGS. 4 and 5. Otherwise, the first sensing electrode 310 may be formed of the metal mesh having the rectangular lattice pattern exemplified in FIG. 4, and the second sensing electrode 320 may be formed of the metal mesh having the rhombus lattice pattern exemplified in FIG. 5.

Hereinafter, a touch position calculated by the touch sensor device 30 according to the exemplary embodiment of the present inventive concept will be described with reference to FIG. 6, and a touch position calculated by a touch sensor device of a comparative example in which a first sensing electrode and a second sensing electrode are formed by one linear electrode will be described with reference to FIG. 7.

Figure 6:
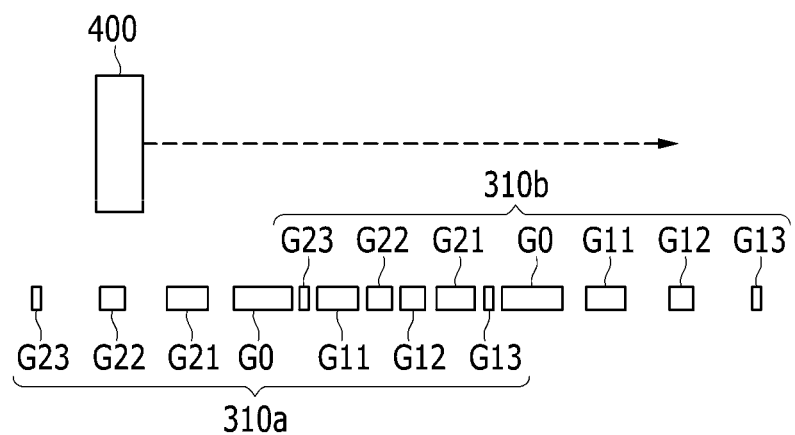
FIG. 6 is a diagram illustrating a touch position calculated by the touch sensor device according to the exemplary embodiment of the present inventive concept.
Figure 6:
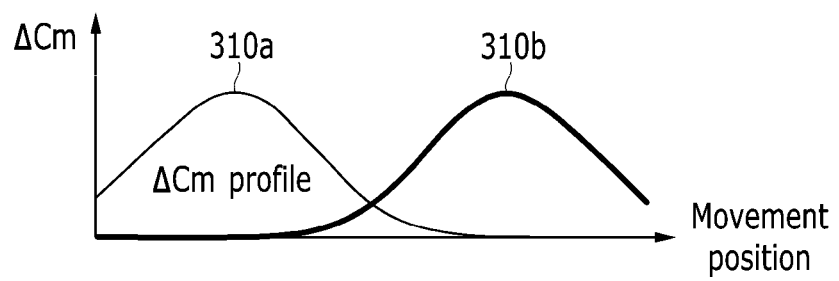
Figure 6:
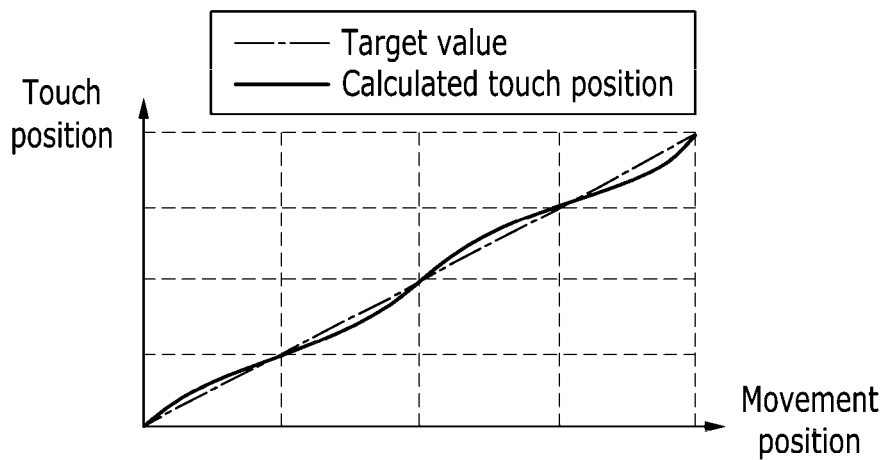

FIG. 6 is a diagram illustrating a touch position calculated by the touch sensor device according to the exemplary embodiment of the present inventive concept.

Referring to FIG. 6, the present inventive concept will be described based on an example in which a touch pen 400 passes through the center electrode group G0 of one first sensing electrode 310a and passes the center electrode group G0 of another first sensing electrode 310b.

A variance in capacitance Δ Cm measured in one first sensing electrode 310a forms a profile in which the variance Δ Cm is largest when the touch pen 400 is located at a center of the first sensing electrode 310a, and is gradually decreased when the touch pen 400 is close to the outer side of the first sensing electrode 310a. A variance in capacitance Δ Cm measured in another first sensing electrode 310b also forms a profile in which the variance Δ Cm is largest when the touch pen 400 is located at the center of the first sensing electrode 310b, and is gradually decreased when the touch pen 400 is close to the outer side of the first sensing electrode 310b. The reason is that the largest number of first linear electrodes 311 are included in the center electrode group G0, so that the largest variance Δ Cm is generated, and the smallest variance Δ Cm is generated in the third electrode groups G13 and G23 including the smallest number of first linear electrodes 311.

The touch controller 350 may calculate a touch position based on the profile of the variance Δ Cm in capacitance. The calculated touch position is very close to a target value that is an actual position of the touch pen 400. Accordingly, it is possible to improve touch accuracy of the touch sensor device 30.

Here, the present inventive concept has been described based on the first sensing electrodes 310a and 310b as an example, but the second sensing electrode 320 is configured identically to the first sensing electrodes 310a and 310b, so that a touch position may be calculated by the same method.

Figure 7:
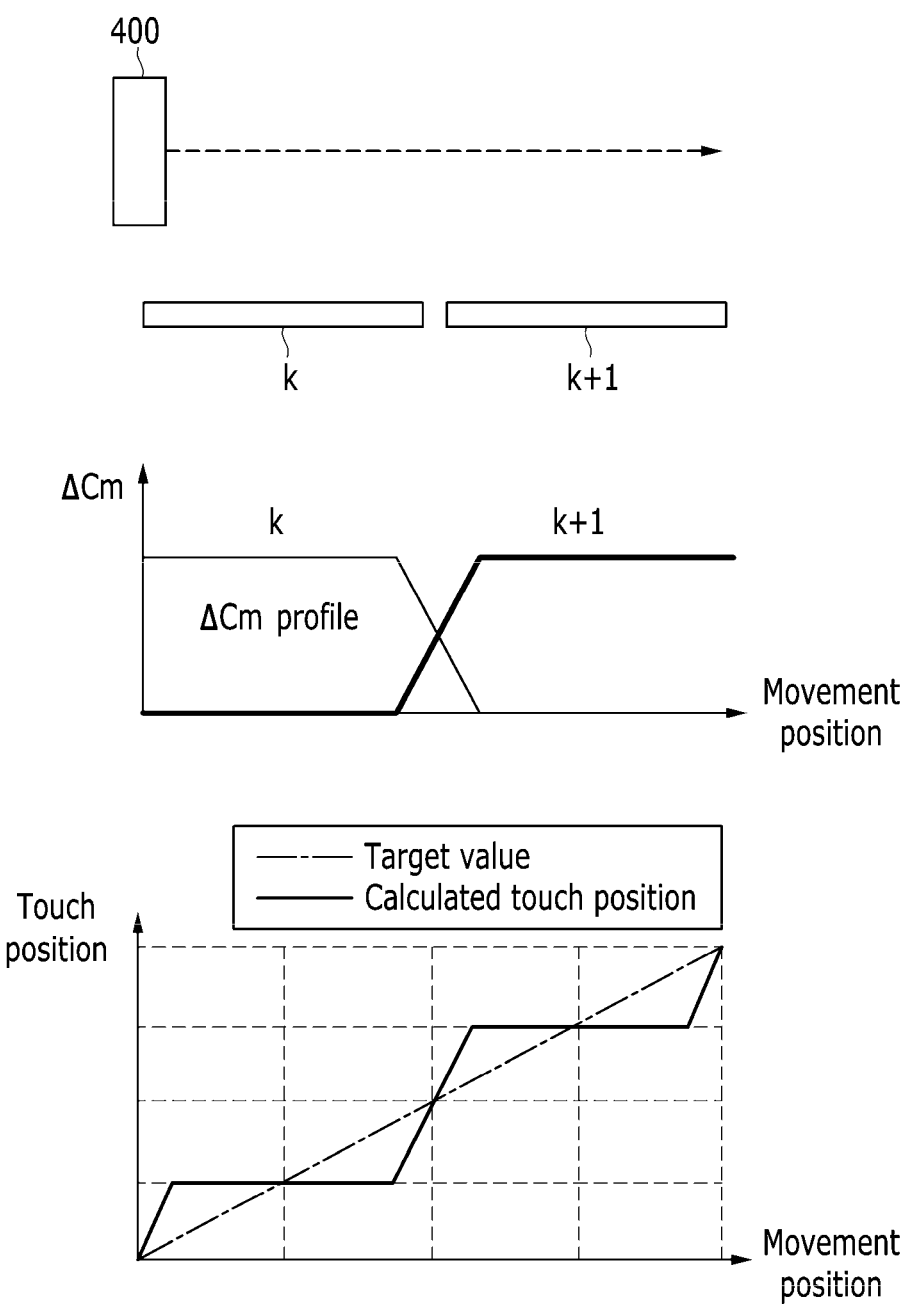
FIG. 7 is a diagram illustrating a touch position calculated by a touch sensor device of the Comparative Example.

FIG. 7 is a diagram illustrating a touch position calculated by a touch sensor device of the comparative example .

Referring to FIG. 7, a first sensing electrode and a second sensing electrode are formed as one linear electrode in the touch sensor device of the Comparative Example. The comparative example will be described based on an example in which a touch pen 400 passes through one first sensing electrode K and another first sensing electrode K+1.

A variance in capacitance Δ Cm measured in the first sensing electrode K is maintained at a predetermined value while the touch pen 400 is located on one first sensing electrode K, and the variance Δ Cm in capacitance measured in the first sensing electrode K is changed to 0 when the touch pen 400 completely deviates from an upper side of one first sensing electrode K and is located on another first sensing electrode K+1. A variance in capacitance Δ Cm measured in another first sensing electrode K+1 is also changed in the same way.

The touch position is inevitably calculated in a stepwise manner based on the profile of the variance in capacitance Δ Cm, and has a difference from a target value that is an actual position of the touch pen 400, and touch accuracy is degraded by the difference.

Hereinafter, a touch sensor device according to another exemplary embodiment of the present inventive concept will be described with reference to FIGS. 8 to 10.

Figure 8:
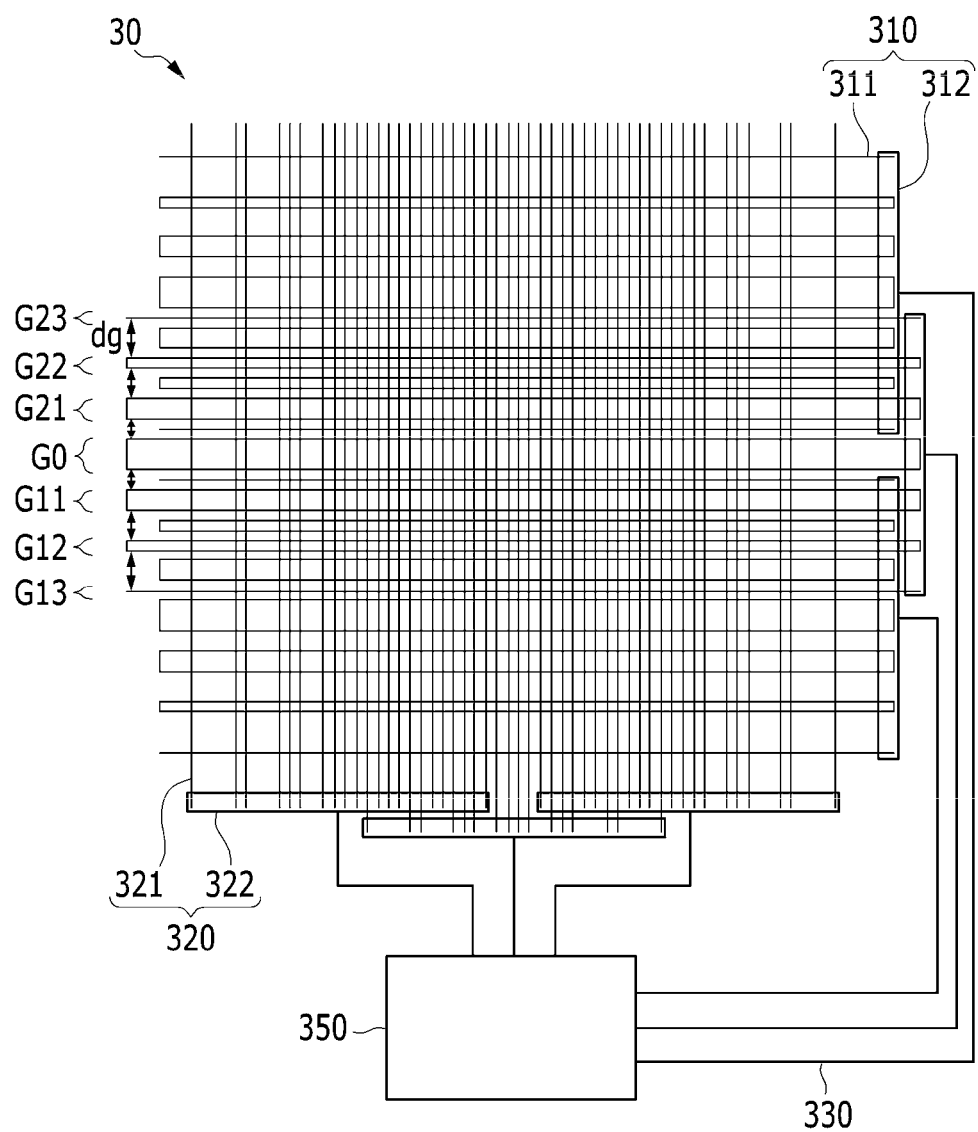
FIG. 8 is a top plan view illustrating a touch sensor device according to another exemplary embodiment of the present inventive concept.

FIG. 8 is a top plan view illustrating a touch sensor device according to another exemplary embodiment of the present inventive concept. FIG. 9 is a diagram illustrating an example of a linear electrode of the touch sensor device of FIG. 8. FIG. 10 is a diagram illustrating an example of the linear electrode of the touch sensor device of FIG. 8.

The touch sensor device is different from the touch sensor device aforementioned with reference to FIG. 3 in that one first linear electrode 311 is included in each of a plurality of electrode groups G0 to G23 included in a first sensing electrode 310. A line width dw of the first linear electrode 311 included in each of the electrode groups G0 to G23 is gradually decreased as a distance from the center electrode group G0 to the plurality of electrode groups is increased. As illustrated in FIG. 8, a line width dw of the first linear electrodes 311 included in the center electrode group G0 among the plurality of electrode groups G0 to G23 is largest. A line width dw of the first linear electrodes 311 included in the first electrode groups G11 and G21 at both sides adjacent to the outer side of the center electrode group G0 is second largest. A line width dw of the first linear electrodes 311 included in the second electrode groups G12 and G22 adjacent to the outer sides of the first electrode groups G11 and G21 is third largest. A line width dw of the first linear electrodes 311 included in the last third electrode groups G13 and G23 adjacent to the outer side of the second electrode groups G12 and G22 is smallest.

Figure 9:
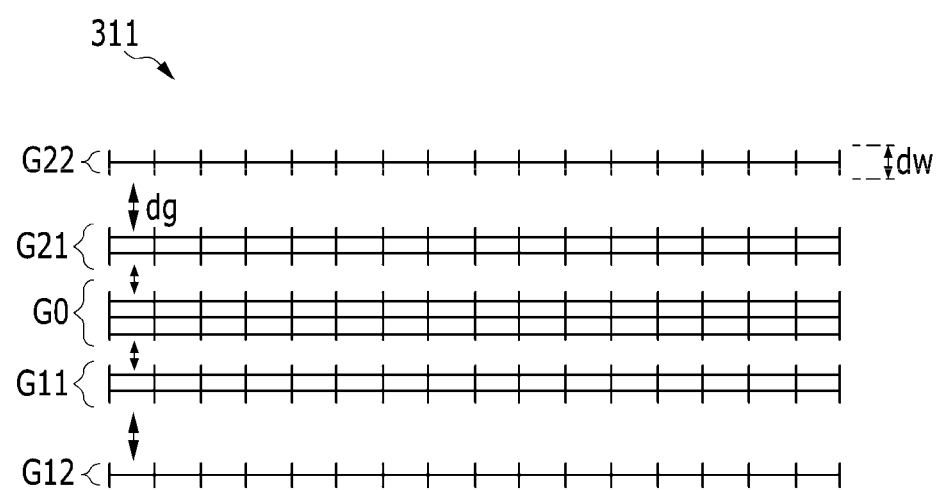
FIG. 9 is a diagram illustrating an example of a linear electrode of the touch sensor device of FIG. 8.
Figure 10:
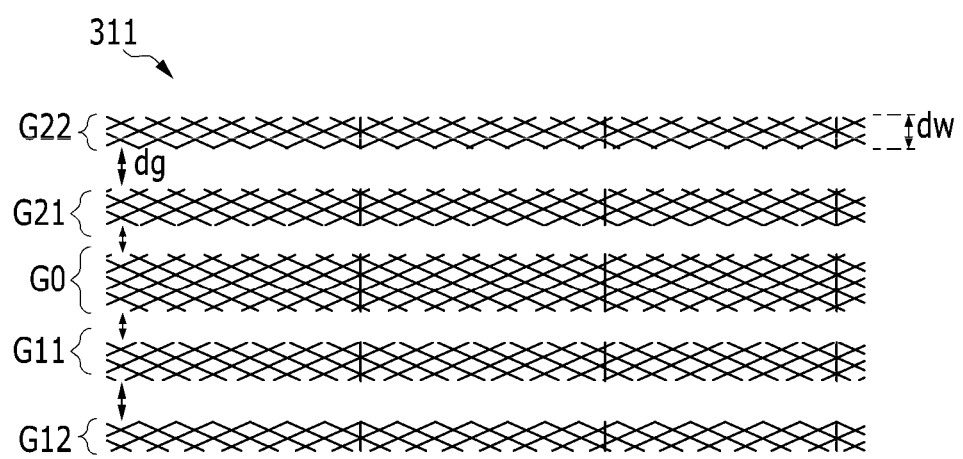
FIG. 10 is a diagram illustrating an example of the linear electrode of the touch sensor device of FIG. 8.

As illustrated in FIG. 9, the first linear electrodes 311 included in each of the plurality of electrode groups G0 to G23 may be formed by a metal mesh having a rectangular lattice pattern. Otherwise, as illustrated in FIG. 10, the first linear electrodes 311 included in each of the plurality of electrode groups G0 to G23 may be formed by a metal mesh having a rhombus lattice pattern.

One or more second linear electrodes 321 having the same line width dw as illustrated in FIG. 3 may also be included in a plurality of electrode groups included in the second sensing electrode 320.

However, one second linear electrode 321 having different line widths dw similar to the first sensing electrode 310 of FIG. 8 may be included in each of the plurality of electrode groups included in the second sensing electrode 320.

As described above, even when one first linear electrode 311 having different line widths dw is included in each of the plurality of electrode groups included in the first sensing electrode 310 or one second linear electrode 321 having different line widths dw is included in each of the plurality of electrode groups included in the second sensing electrode 320, a linear touch position may be calculated as described with reference to FIG. 6.

Other configurations which are not described herein are the same as those described with reference to FIG. 3, so that detailed descriptions thereof will be omitted.

Figure 11:
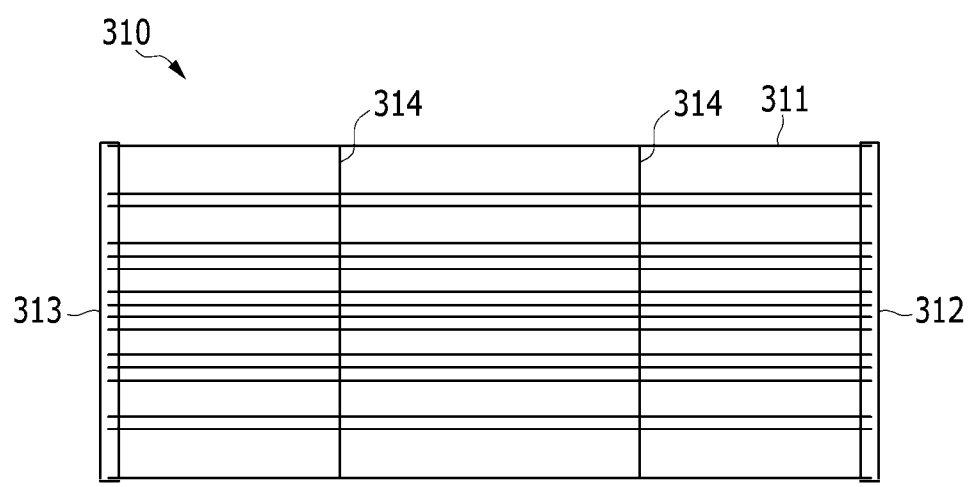
FIG. 11 is a diagram illustrating an example of a sensing electrode of the touch sensor device according to the present inventive concept.

FIG. 11 is a diagram illustrating an example of the sensing electrode of the touch sensor device according to the present inventive concept. FIG. 11 illustrates one first sensing electrode 310.

The first sensing electrode 310 described with reference to FIGS. 3 and 8 may further include a first sub connection electrode 313 and/or a first cross connection electrode 314, as well as the plurality of first linear electrodes 311 and the first connection electrode 312.

The first sub connection electrode 313 extends from the other end of each of the plurality of first linear electrodes 311 in the second direction perpendicular to the first direction to physically connect the plurality of first linear electrodes 311 to each other. The first sub connection electrode 313 may be disposed in the non-active area.

The first cross connection electrodes 314 extends in the second direction within the active area to physically connect the plurality of first linear electrodes 311 to each other. The first cross connection electrodes 314 may connect the plurality of first linear electrodes with a bridge type. One or more first cross connection electrodes 314 may be disposed within the active area.

It is possible to decrease a sensing defect due to disconnection of the plurality of first linear electrodes 311 by disposing the first sub connection electrode 313 and the first cross connection electrode 314.

The configuration may be equally applied even to the second sensing electrode 320. That is, the second sensing electrode 320 may further include a second sub connection electrode (not illustrated) and/or a second cross connection electrode (not illustrated), as well as the plurality of second linear electrodes 321 and the second connection electrode 322.

The accompanying drawings and the detailed description of the inventive concept as described above are only an example of the present inventive concept, which are used for the purpose of describing the present inventive concept but are not used to limit the meanings or the scope of the present inventive concept described in the claims. Therefore, the person skilled in the art would understand that various modifications and other exemplary embodiments equivalent to the present inventive concept are feasible. Accordingly, the scope of the present inventive concept should be defined based on the accompanying claims.

What is claimed is:

1. A touch sensor device, comprising:
   a plurality of first sensing electrodes each of which includes a plurality of first linear electrodes extending in a first direction and a first connection electrode connecting the plurality of first linear electrodes to each other; and
   a plurality of second sensing electrodes each of which includes a plurality of second linear electrodes extending in a second direction perpendicular to the first direction and a second connection electrode connecting the plurality of second linear electrodes to each other,
   wherein a disposition density of the plurality of first linear electrodes included in one first sensing electrode among the plurality of first sensing electrodes is gradually decreased from a center of the first sensing electrode to an outer side of the first sensing electrode, and wherein the plurality of first linear electrodes included in the first sensing electrode forms a plurality of electrode groups, a group interval between the plurality of electrode groups is larger than a line interval between adjacent first linear electrodes, and the first linear electrodes included in another adjacent first sensing electrode are disposed between the plurality of electrode groups included in the first sensing electrode.

2. The touch sensor device of claim 1, wherein:
the number of first linear electrodes included in each of the electrode groups is gradually decreased from a center electrode group to an outer electrode group.

3. The touch sensor device of claim 2, wherein:
the group interval is increased from the center electrode group to the outer electrode group.

4. The touch sensor device of claim 3, wherein:
an n−1 first linear electrodes included in the another adjacent first sensing electrode are disposed between the electrode groups having the group interval that is n times of the line interval and n is a positive integer greater than one.

5. The touch sensor device of claim 4, wherein:
a disposition density of the plurality of second linear electrodes included in one second sensing electrode is gradually decreased from a center of the second sensing electrode to an outer side of the second sensing electrode.

6. The touch sensor device of claim 5, wherein:
the plurality of second linear electrodes included in the second sensing electrode forms a plurality of electrode groups, and the number of second linear electrodes included in each of the electrode groups is gradually decreased from a center electrode group to an outer electrode group.

7. The touch sensor device of claim 6, wherein:
the second linear electrodes included in another adjacent second sensing electrode are disposed between the electrode groups included in the second sensing electrode.

8. The touch sensor device of claim 7, wherein:
at least one of the plurality of first linear electrodes and the plurality of second linear electrodes is formed of a transparent conductive material, such as indium tin oxide (ITO) and indium zinc oxide (IZO).

9. The touch sensor device of claim 7, wherein:
at least one of the plurality of first linear electrodes and the plurality of second linear electrodes is formed by a metal mesh having a rectangular lattice pattern.

10. The touch sensor device of claim 7, wherein:
at least one of the plurality of first linear electrodes and the plurality of second linear electrodes is formed by a metal mesh having a rhombus lattice pattern.

11. The touch sensor device of claim 1, wherein:
a line width of the plurality of second linear electrodes included in one second sensing electrode is gradually decreased from a center of the second sensing electrode to an outer side of the second sensing electrode.

12. The touch sensor device of claim 1, wherein:
the first connection electrode extends from one end of each of the plurality of first linear electrodes in the second direction to connect the plurality of first linear electrodes to each other.

13. The touch sensor device of claim 12, wherein:
the first sensing electrode further includes
a first cross connection electrode which extends in the second direction within an active area, in which the plurality of first linear electrodes and the plurality of second linear electrodes cross, and connects the plurality of first linear electrodes to each other.

14. The touch sensor device of claim 13, wherein:
the first sensing electrode further includes
a first sub connection electrode which extends from the other end of each of the plurality of first linear electrodes in the second direction and connects the plurality of first linear electrodes to each other.

15. The touch sensor device of claim 13, wherein:
the second sensing electrode further includes
a second cross connection electrode which extends in the first direction within the active area and connects the plurality of second linear electrodes to each other.

16. The touch sensor device of claim 13, wherein:
the second sensing electrode further includes
a second sub connection electrode which extends from the other end of each of the plurality of second linear electrodes in the first direction and connects the plurality of second linear electrodes to each other.

17. A display device, comprising:
a display panel which displays an image;
a first sensing electrode which is disposed on the display panel and includes a plurality of first linear electrodes extending in a first direction and a first connection electrode connecting the plurality of first linear electrodes to each other; and
a second sensing electrode which is disposed on the first sensing electrode and includes a plurality of second linear electrodes extended in a second direction perpendicular to the first direction and a second connection electrode connecting the plurality of second linear electrodes to each other,
wherein a disposition density of the plurality of first linear electrodes is gradually decreased from a center to an outer side of the first sensing electrode, and
wherein the plurality of first linear electrodes included in the first sensing electrode forms a plurality of electrode groups, a group interval between the plurality of electrode groups is larger than a line interval between the adjacent first linear electrodes, and the first linear electrodes included in another adjacent first sensing electrode are disposed between the electrode groups included in the first sensing electrode.

18. The display device of claim 17, wherein:
a line width of the plurality of second linear electrodes is gradually decreased from a center to and outer side of the second sensing electrode.

* * * * *